United States Patent
Jinguu et al.

(10) Patent No.: US 9,942,288 B2
(45) Date of Patent: Apr. 10, 2018

(54) DEVICE SETTING APPARATUS, STORAGE STORING DEVICE SETTING PROGRAM, AND METHOD FOR SHARING INFORMATION AMONG A PLURALITY OF DEVICE SETTING APPARATUSES

(71) Applicant: YOKOGAWA ELECTRIC CORPORATION, Musashino-shi, Tokyo (JP)

(72) Inventors: Yoshiyuki Jinguu, Tokyo (JP); Hiromi Okamoto, Tokyo (JP); Hiroaki Kanokogi, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 365 days.

(21) Appl. No.: 14/605,269

(22) Filed: Jan. 26, 2015

(65) Prior Publication Data

US 2015/0222674 A1    Aug. 6, 2015

(30) Foreign Application Priority Data

Feb. 6, 2014   (JP) ................................ 2014-021293

(51) Int. Cl.
     *H04L 29/06*      (2006.01)
     *G06F 17/30*      (2006.01)
     *G05B 19/042*     (2006.01)
     *G05B 23/02*      (2006.01)

(52) U.S. Cl.
CPC ........ *H04L 65/403* (2013.01); *G05B 19/0426* (2013.01); *G06F 17/30312* (2013.01); *G05B 23/0283* (2013.01); *G05B 2219/25066* (2013.01); *G05B 2219/25232* (2013.01); *G05B 2219/25428* (2013.01); *G05B 2219/31334* (2013.01); *G05B 2219/32226* (2013.01); *G05B 2219/32235* (2013.01); *Y02P 90/14* (2015.11); *Y02P 90/16* (2015.11); *Y02P 90/185* (2015.11)

(58) Field of Classification Search
CPC .. H04L 65/403; G06F 17/30312; Y02P 90/16; G05B 2219/25066; G05B 23/0283; G05B 19/0426

See application file for complete search history.

(56) References Cited

U.S. PATENT DOCUMENTS

| | | | |
|---|---|---|---|
| 6,014,669 | A | 1/2000 | Slaughter et al. |
| 6,801,920 | B1 | 10/2004 | Wischinski |
| 6,978,294 | B1 | 12/2005 | Adams et al. |
| 2006/0053114 | A1 | 3/2006 | Burr et al. |

(Continued)

FOREIGN PATENT DOCUMENTS

| | | |
|---|---|---|
| JP | 2004-30245 A | 1/2004 |
| JP | 2008-171086 A | 7/2008 |

(Continued)

*Primary Examiner* — Kim T Nguyen (74) *Attorney, Agent, or Firm* — Sughrue Mion, PLLC (57) ABSTRACT

A device setting apparatus according to one aspect of the present invention includes a data transmission processor configured to automatically and collectively acquire information used in at least one another device setting apparatus as other-device information from an external storage and an other-device information storage storing the other-device information. The external storage is communicatively connectable to the device setting apparatus via a network.

15 Claims, 9 Drawing Sheets

(56) References Cited

U.S. PATENT DOCUMENTS

2009/0238213 A1* 9/2009 Kasatani ............ H04N 1/00344
  370/503
2010/0249956 A1 9/2010 Bliss et al.

FOREIGN PATENT DOCUMENTS

| JP | 2011-86119 A | 4/2011 |
| JP | 2013-37544 A | 2/2013 |
| JP | 2013-77197 A | 4/2013 |

* cited by examiner

DEVICE SETTING APPARATUS, STORAGE STORING DEVICE SETTING PROGRAM, AND METHOD FOR SHARING INFORMATION AMONG A PLURALITY OF DEVICE SETTING APPARATUSES

BACKGROUND OF THE INVENTION

Field of the Invention

The present invention relates to a device setting apparatus, a storage storing a device setting program, and a method for sharing information among a plurality of device setting apparatuses.

Priority is claimed on Japanese Patent Application No. 2014-021293, filed Feb. 6, 2014, the contents of which are incorporated herein by reference.

Description of Related Art

In a plant or a factory or the like (hereinafter, collectively referred to as a plant), a distributed control system (DCS), in which on-site devices (measuring instruments and actuators) referred to as field devices and control apparatuses to provide control thereof are connected via a communication means, has been implemented to achieve a high level of automated operation. In the plant, in which such a distributed control system is implemented, regular or non-regular maintenance of field devices is performed by a worker in terms of prevention of abnormal operation, maintenance of measuring accuracy, or the like.

As described in Japanese Patent Application Laid-Open Publication No. 2011-86119 and Japanese Patent Application Laid-Open Publication No. 2013-77197, it is often the case that maintenance of field devices is performed using a device setting apparatus such as a laptop or tablet computer and a personal digital assistant (PDA). The device setting apparatus can perform wired or wireless communication with the field devices, and has been installed with a dedicated tool (device setting adjustment tool) for performing setting and adjustment of the field devices. Specifically, during the maintenance of field devices, a worker operates the device setting apparatus to read and confirm device information (parameter) set in a target field device, and operates the device setting apparatus to set new device information to the field device.

Generally, since a plurality of field devices are installed in a plant, the maintenances of the field devices are performed parallel using a plurality of device setting apparatuses in order to achieve a shortening of maintenance time or the like. In each device setting apparatus, maintenance information (information including device information, setting information, operation history information, and the like) is generated based on information input from the field device during the maintenance. The maintenance information is related to the filed device, on which the maintenance is performed. When a plurality of device setting apparatuses is used, the maintenance information is not shared among these device setting apparatuses. Therefore, there are some cases where a redundant operation occurs, in which after one worker using one device setting apparatus has performed a maintenance operation to a field device, other worker performs a similar maintenance operation to the field device.

In order to avoid such a redundant operation, nowadays, a dedicated shared server for managing the maintenance information in an integrated fashion is installed, and the maintenance information stored in the shared server is transmitted to each device setting apparatus, thereby, the maintenance information is shared. Specifically, each device setting apparatus is connected to a network between an interval of the maintenance operations by night or the like, each device setting apparatus uploads maintenance information generated in each device setting apparatus to the shared server via the network, and each device setting apparatus downloads maintenance information generated in other device setting apparatuses.

However, in order to operate such an operation sharing the maintenance information, a worker is required to search maintenance information related to a device setting apparatus other than a device setting apparatus used by himself among large quantities of maintenance information uploaded to the shared server, and to select and download the searched maintenance information. Therefore, the operation for sharing maintenance information places a burden on a worker.

In addition, the operation for providing the dedicated shared server and sharing maintenance information, not only places a burden on a worker, but also causes cost increase due to the installation of the shared server.

Such a situation is not limited to a case where the sharing of maintenance information is performed, but occurs when information stored in each device setting apparatus is shared among all device setting apparatuses regardless of the kind of information.

SUMMARY OF THE INVENTION

One aspect of the present invention provides a device setting apparatus, which can easily share information used in each of a plurality of device setting apparatuses, a storage storing a device setting program, and a method for sharing information among a plurality of device setting apparatuses.

A device setting apparatus according to one aspect of the present invention may includes a data transmission processor configured to automatically and collectively acquire information used in at least one another device setting apparatus as other-device information from an external storage and an other-device information storage storing the other-device information. The external storage may be communicatively connectable to the device setting apparatus via a network.

In the above-described device setting apparatus, the data transmission processor may be configured to update the other-device information when a time-stamp of the acquired other-device information is newer than a time-stamp of the other-device information previously stored in the other-device information storage.

The above-described device setting apparatus may further include an own-device information storage storing information used in the device setting apparatus as own-device information and a data display processor configured to integrate and display the own-device information and the other-device information.

In the above-described device setting apparatus, the external storage may correspond to a shared storage storing information used in a plurality of device setting apparatuses. The data transmission processor may be configured to input information used in the device setting apparatus into the shared storage as own-device information and to acquire the other-device information stored in the shared storage.

In the above-described device setting apparatus, the external storage may correspond to a plurality of other device setting apparatuses. The other device setting apparatuses may include a first device setting apparatus and a second device setting apparatus. The data transmission processor may be configured to acquire first information related to the first device setting apparatus and second information related to the second device setting apparatus from the first device setting apparatus as the other-device information when the first device setting apparatus stores the second information.

A non-transitory computer-readable storage medium according to one aspect of the present invention may store a computer program which when executed by an apparatus, causes the apparatus to perform automatically and collectively acquiring information used in at least one another apparatus as other-device information from an external storage and storing the other-device information. The external storage may be connectable to the apparatus via a network.

In the above-described non-transitory computer-readable storage medium, automatically and collectively acquiring the information used in the at least one another apparatus as the other-device information may include updating the other-device information when a time-stamp of the acquired other-device information is newer than a time-stamp of the previously stored other-device information.

In the above-described non-transitory computer-readable storage medium, the computer program, which when executed by the apparatus, may further causes the apparatus to perform storing information used in the apparatus as own-device information and integrating and displaying the own-device information and the other-device information.

In the above-described non-transitory computer-readable storage medium, the external storage may correspond to a shared storage storing information used in a plurality of apparatuses. Automatically and collectively acquiring the information used in the at least one another apparatus as the other-device information may include inputting information used in the apparatus into the shared storage as own-device information and acquiring the other-device information stored in the shared storage.

In the above-described non-transitory computer-readable storage medium, the external storage may correspond to a plurality of other apparatuses. The other apparatuses may include a first apparatus and a second apparatus. Automatically and collectively acquiring the information used in the at least one another apparatus as the other-device information may include acquiring first information related to the first apparatus and second information related to the second apparatus from the first apparatus as the other-device information when the first apparatus stores the second information.

A method for sharing information among a plurality of device setting apparatuses according to one aspect of the present invention may include connecting a device setting apparatus to a network and automatically and collectively inputting information used in at least one another device setting apparatus as other-device information from an external storage into the device setting apparatus and storing the other-device information in the device setting apparatus. The external storage may be communicatively connectable to the device setting apparatus via the network.

In the above-described method for sharing the information, storing the other-device information in the device setting apparatus may include updating the other-device information when a time-stamp of the input other-device information is newer than a time-stamp of the previously stored other-device information.

The above-described method for sharing the information further include storing information used in the device setting apparatus as own-device information in the device setting apparatus and integrating and displaying the own-device information and the other-device information.

In the above-described method for sharing the information, the external storage may correspond to a shared storage storing information used in the plurality of device setting apparatuses. Storing the other-device information in the device setting apparatus may include inputting information used in the device setting apparatus into the shared storage as own-device information and acquiring the other-device information stored in the shared storage.

In the above-described method for sharing the information, the external storage may correspond to a plurality of other device setting apparatuses. The other device setting apparatuses may include a first device setting apparatus and a second device setting apparatus. Storing the other-device information in the device setting apparatus may include acquiring first information related to the first device setting apparatus and second information related to the second device setting apparatus from the first device setting apparatus as the other-device information when the first device setting apparatus stores the second information.

According to one aspect of the present invention, when a device setting apparatus (or device setting means) is connected to a network, information used in other device setting apparatuses (or other device setting means) is automatically and collectively acquired as other-device setting information from an external storage means via the network. Therefore, information used in each of a plurality of device setting apparatuses can be easily shared.

DETAILED DESCRIPTION OF THE INVENTION

Hereinafter, a device setting apparatus, a storage storing a device setting program, and a method for sharing information among a plurality of device setting apparatuses according to several embodiments of the present invention will be described in detail, with references made to the drawings.

[Field Device Setting System]

Figure 1:
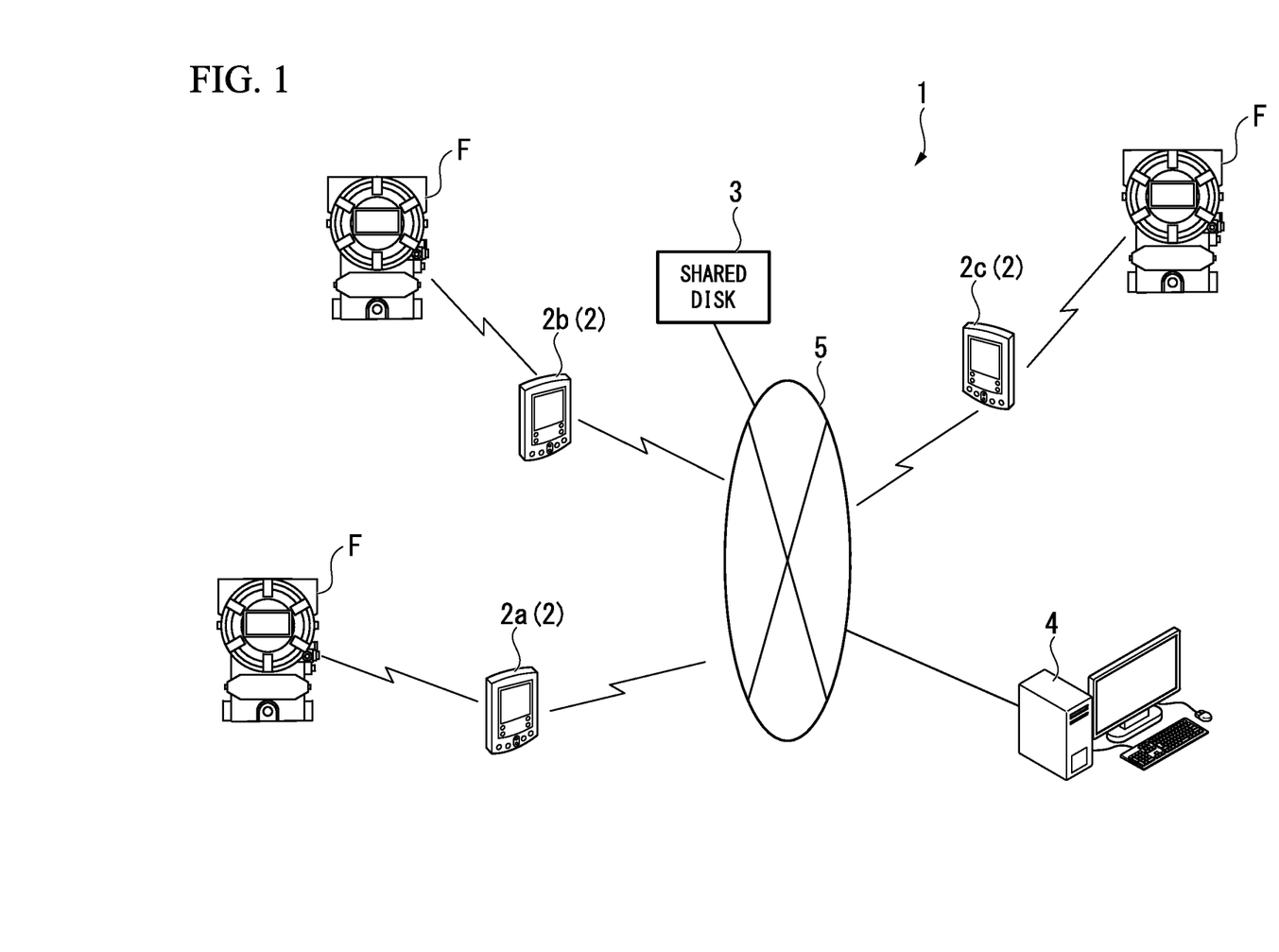
FIG. 1 is a block diagram schematically showing an overall configuration of a field device setting system using a mobile terminal device according to an embodiment of the present invention.

FIG. 1 is a block diagram schematically showing an overall configuration of a field device setting system 1 using a mobile terminal device 2 according to an embodiment of a device setting apparatus (device setting means) of the present invention. The field device setting system 1 is configured to communicate with a field device F installed on a plant to acquire information from the field device F and to set information to the field device F. The field device F includes, for example, a sensor device such as a flow gauge or temperature sensor, a valve device such as a flow rate control valve or open and close value, an actuator device such as a fan or motor, and other devices installed on a plant. FIG. 1 shows only three field devices F. However, a plurality of field devices F is actually installed on a plant.

As shown in FIG. 1, the field device setting system 1 includes a plurality of mobile terminal devices 2, a shared disk 3 (external storage means, shared storage means), a terminal device 4, and a network 5. In the present embodiment, in order to simplify the explanation and facilitate the understanding, a configuration in which three mobile terminal devices 2 (a mobile terminal device 2a, a mobile terminal device 2b, and a mobile terminal device 2c) are provided is described. A configuration including even more mobile terminal devices may be adapted.

The mobile terminal device 2 is a terminal device, which a worker for performing a maintenance operation in a plant carries. The mobile terminal device 2 communicates with the field device F, acquires and displays various information stored in the field device F, and performs the setting of the field device F. Each mobile terminal devices 2 is connected to the field device F via wire communication, or near field communication or wireless communication used in industrial application (ISA100.11a, Wireless HART, or the like), and acquires and displays device information specifying the field device F, setting information set in the field device F, measured information measured by the field device F, or the like by communicating with the field device F. In addition, the mobile terminal device 2 performs setting of the field device F in accordance with instructions of a worker. Each mobile terminal device 2 is not always connected to the network 5, and, for example, each mobile terminal devices 2 is connected to the network 5 at a specific place such as an office, or during the setting of the field device F.

The shared disk 3 is a storage always connected to the network 5, and, for example, includes a hard-disk device. The shared disk 3 is not necessarily dedicated to the field device setting system 1, and may be shared with another system. Such a shared disk 3 stores information (own-terminal data Q1 described later) input from each mobile terminal device 2 via the network 5.

The terminal device 4 is a stationary terminal, which can perform a communication via the network 5, and is used by a manager of the field device setting system 1. The terminal device 4 totally manages information input from each mobile terminal device 2 via the network 5, information for updating each mobile terminal device 2, or the like.

The network 5 communicatively connects each mobile terminal device 2, the shared disk 3, and the terminal device 4. The network 5 directly and communicatively connects the mobile terminal devices 2 to one another. The network 5 is not limited to a specific one. The Internet or the like may be used as the network 5. Considering the security, using a Local Area Network (LAN) provided in a plant as the network 5 is desirable. The LAN may be a wire communication or a wireless communication.

In such a field device setting system 1, other terminal devices 2 and the shared disk 3 are defined as an external storage means of the present invention with regard to the specific mobile terminal device 2. In other words, the terminal device 2b, the terminal device 2c, and the shared disk 3 are defined as the external storage means of the present invention with regard to the mobile terminal device 2a. The terminal device 2a, the terminal device 2c, and the shared disk 3 are defined as the external storage means of the present invention with regard to the mobile terminal device 2b. The terminal device 2a, the terminal device 2b, and the shared disk 3 are defined as the external storage means of the present invention with regard to the mobile terminal device 2c.

[Configuration of Mobile Terminal Device 2]

Figure 2:
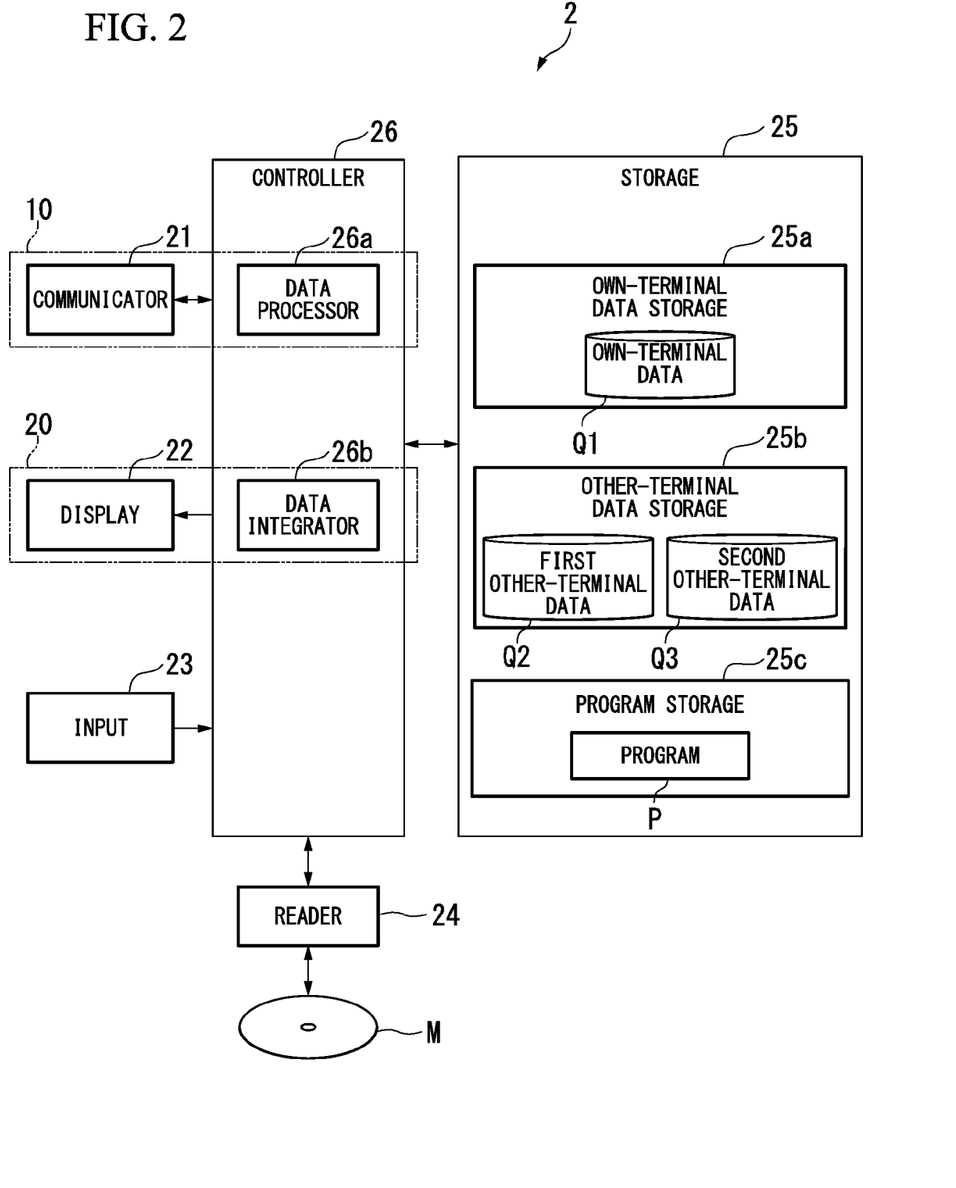
FIG. 2 is a block diagram showing the main parts of the configuration of the mobile terminal device according to the embodiment of the present invention.

FIG. 2 is a block diagram showing the main parts of the configuration of the mobile terminal 2 device according to the embodiment of the present invention. As shown in FIG. 2, the mobile terminal device 2 includes a communicator 21, a display 22, an input 23, a reader 24, a storage 25, and a controller 26.

The communicator 21 performs a communication with the field device F under the control of the controller 26, and also performs a communication via the network 5. The display 22 includes a display or the like, and visualizes and displays information stored in the storage 25 and information generated in the controller 26 under the control of the controller 26. The input 23 includes an input device including a keyboard, mouse, and the like, and inputs instructions in accordance with operations of a worker into the controller 26.

The reader 24 reads information stored in a removable media M such as Compact Disc Read Only Memory (CD-ROM) and input the information into the controller 26. The removable media M is a storage media of the present invention, and stores a program P which is described later (device setting program). The program P stored in the removable media M is input into the controller 26 by the reader 24 and is written into the storage 25 by the controller 26.

The storage 25 includes a volatile memory such as a Random Access Memory (RAM) or a non-volatile memory such as a Read Only Memory (ROM) and Electrically Erasable and Programmable ROM (EEPROM). The storage 25 includes an own-terminal data storage 25a (own-device information storage) for storing own-terminal data Q1 (own-device information), an other-terminal data storage 25b (other-device information storage, other-device information storage means) for storing first other-terminal data Q2 (other-device information) and second other-terminal data Q3 (other-device information), and a program storage 25c for storing the program P.

The own-terminal data Q1 is package data including information used in the mobile terminal device 2, which includes the storage 25 storing the own-terminal data Q1.

The own-terminal data Q1 includes maintenance information, which has been related to each field device F and acquired. The maintenance information includes, for example, device information of the field device F, setting information and operation history of the field device F, confirmation points input by a worker, and the like.

The first other-terminal data Q2 is package data including information used in one of two mobile terminal devices 2 other than the mobile terminal device 2 including the storage 25 storing the first other-terminal data Q2. Similar to the own-terminal data Q1, the first other-terminal data Q2 includes maintenance information, which has been related to each field device F and acquired.

The second other-terminal data Q3 is package data including information used in the other of the two mobile terminal devices 2 other than the mobile terminal device 2 including the storage 25 storing the second other-terminal data Q3 (in other words, the other mobile terminal device 2 different from the mobile terminal device 2 generating the first other-terminal data Q2). Similar to the own-terminal data Q1, the second other-terminal data Q3 includes maintenance information, which has been related to each field device F and acquired.

For example, with regard to the mobile terminal device 2a, the own-terminal data Q1 is package data including maintenance information generated by the mobile terminal device 2a, the first other-terminal data Q2 is package data including maintenance information generated by the mobile terminal device 2b, and the second other-terminal data Q3 is package data including maintenance information generated by the mobile terminal device 2c. Alternatively, with regard to the mobile terminal device 2a, the second other-terminal data Q3 may be package data including maintenance information generated by the mobile terminal device 2b, and the first other-terminal data Q2 may be package data including maintenance information generated by the mobile terminal device 2c. For the purpose of illustration, in the present embodiment, the first other-terminal data Q2 is defined as a package data including maintenance information generated by the mobile terminal device 2b, and the second other-terminal data Q3 is defined as package data including maintenance information generated by the mobile terminal device 2c.

The first other-terminal data Q2 is package data including maintenance information generated by the mobile terminal device 2a (or the mobile terminal device 2c) and the second other-terminal data Q3 is package data including maintenance information generated by the mobile terminal device 2c (or the mobile terminal device 2a) with regard to the mobile terminal device 2b. The first other-terminal data Q2 is package data including maintenance information generated by the mobile terminal device 2a (or the mobile terminal device 2b) and the second other-terminal data Q3 is package data including maintenance information generated by the mobile terminal device 2b (or the mobile terminal device 2a) with regard to the mobile terminal device 2c.

The program P is a control program in which operations of the controller 26 are written in accordance with the operation procedure. As described above, the program P is read from the removable media M, and written into the storage 25 by the reader 24. Alternatively, the program P is not read from removable media M, but may be acquired via the network 5.

The program P makes the mobile terminal device 2 act as a data transmission processor 10 (data transmission processing means) when the mobile terminal device 2 is connected to the network 5. The data transmission processor 10 automatically and collectively acquires the first other-terminal data Q2 and the second other-terminal data Q3. When either of the first other-terminal data Q2 and the second other-terminal data Q3 exists as other devices (the other mobile terminal devices 2 and the shared disk 3) connected to the mobile terminal device 2 via the network 5, the program P makes the mobile terminal device 2 acquire only the existing data in the other devices. When none of the first other-terminal data Q2 and the second other-terminal data Q3 are in the other devices, the program makes the mobile terminal device 2 finish the processing. In other words, when the mobile terminal device 2 is connected to the network 5, the program P makes the mobile terminal device 2 automatically and collectively acquire information, which exists in the other devices (the other mobile terminal devices 2 and the shared disk 3) connected to the mobile terminal device 2 via the network 5 and is used in other mobile terminal devices 2.

The program P makes the mobile terminal device 2 function as the own-terminal data storage 25a storing the own-terminal data Q1, and makes the mobile terminal device 2 function as the other-terminal data storage 25b storing the first other-terminal data Q2 and the second other-terminal data Q3. In addition, the program P makes the mobile terminal device 2 function as a data display processor 20 for collectively displaying the own-terminal data Q1 and at least one of the first other-terminal data Q2 and the second other-terminal data Q3.

The controller 26 totally controls the operations of the mobile terminal device 2. In the present embodiment, the controller 26 includes a data processor 26a and a data integrator 26b. The data processor 26a generates the above-described maintenance information, and generates the own-terminal data Q1 including the maintenance information. The data processor 26a and the communicator 21 configure the data transmission processor 10. As described above, when the mobile terminal device 2 is connected to the network 5, the data transmission processor 10 having such a configuration automatically and collectively acquires the first other-terminal data Q2 and the second other-terminal data Q3 stored in the other devices (the other mobile terminal devices 2 and the shared disk 3) connected to the mobile terminal device 2 via the network 5.

When the first other-terminal data Q2 or the second other-terminal data Q3 previously stored in the other-terminal data storage 25b exists and the first other-terminal data Q2 or the second other-terminal data Q3 acquired later has been generated after the generation of the first other-terminal data Q2 or the second other-terminal data Q3 previously stored in the other-terminal data storage 25b, the data transmission processor 10 performs an overwrite processing of the first other-terminal data Q2 or the second other-terminal data Q3. For example, the data transmission processor 10 compares one time-stamp of the first other-terminal data Q2 or the second other-terminal data Q3 previously stored in the other-terminal data storage 25b to the other time-stamp of the first other-terminal data Q2 or the second other-terminal data Q3 acquired later, determines which is newer, the one time-stamp or the other time-stamp, and determines whether to perform the overwrite processing in order to store the newest information in the other-terminal storage 25b.

When the data transmission processor 10 acquires at least one of the first other-terminal data Q2 and the second other-terminal data Q3 from the shared disk 3, the data transmission processor 10 inputs the own-terminal data Q1 into the shared disk 3. When the data transmission processor 10 acquires at least one of the first other-terminal data Q2 and the second other-terminal data Q3 from another mobile terminal device 2, the data transmission processor 10 does not input the own-terminal data Q1 into another mobile terminal device 2. When another mobile terminal device 2 is set to unconditionally receive the own-terminal data Q1, the data transmission processor 10 may input the own-terminal data Q1 into another mobile terminal device 2.

The data integrator 26b integrates the own-terminal data Q1 stored in the own-terminal data storage 25a and at least one of the first other-terminal data Q2 and the second other-terminal data Q3 stored in the other-terminal data storage 25b. The data integrator 26b and the display 22 configure the data display processor 20. As described above, the data display processor 20 having such a configuration integrates and displays the own-terminal data Q1 and at least one of the first other-terminal data Q2 and the second other-terminal data Q3.

The mobile terminal device 2 having such a configuration includes a computer including a hardware resource such as a Micro-Processing Unit (MPU), which is not shown, and implements the above-described function by operating the MPU or the like based on the program P (software). In other words, the function of the mobile terminal device 2 is implemented by the cooperation of the software and the hardware resource.

[Operations of the Mobile Terminal Device 2]

Next, the operations of the mobile terminal device 2 for sharing information among a plurality of mobile terminal devices 2 based on the program P (a method for sharing information among a plurality of device setting apparatuses) will be described. Hereinafter, descriptions with a focus on the mobile terminal device 2a will be given. Since the operations with a focus on the mobile terminal device 2b or the mobile terminal device 2c are similar to those of the mobile terminal device 2a, detailed descriptions are omitted.

(Acquisition of Other-Terminal Data from the Shared Disk 3)

Figure 3:
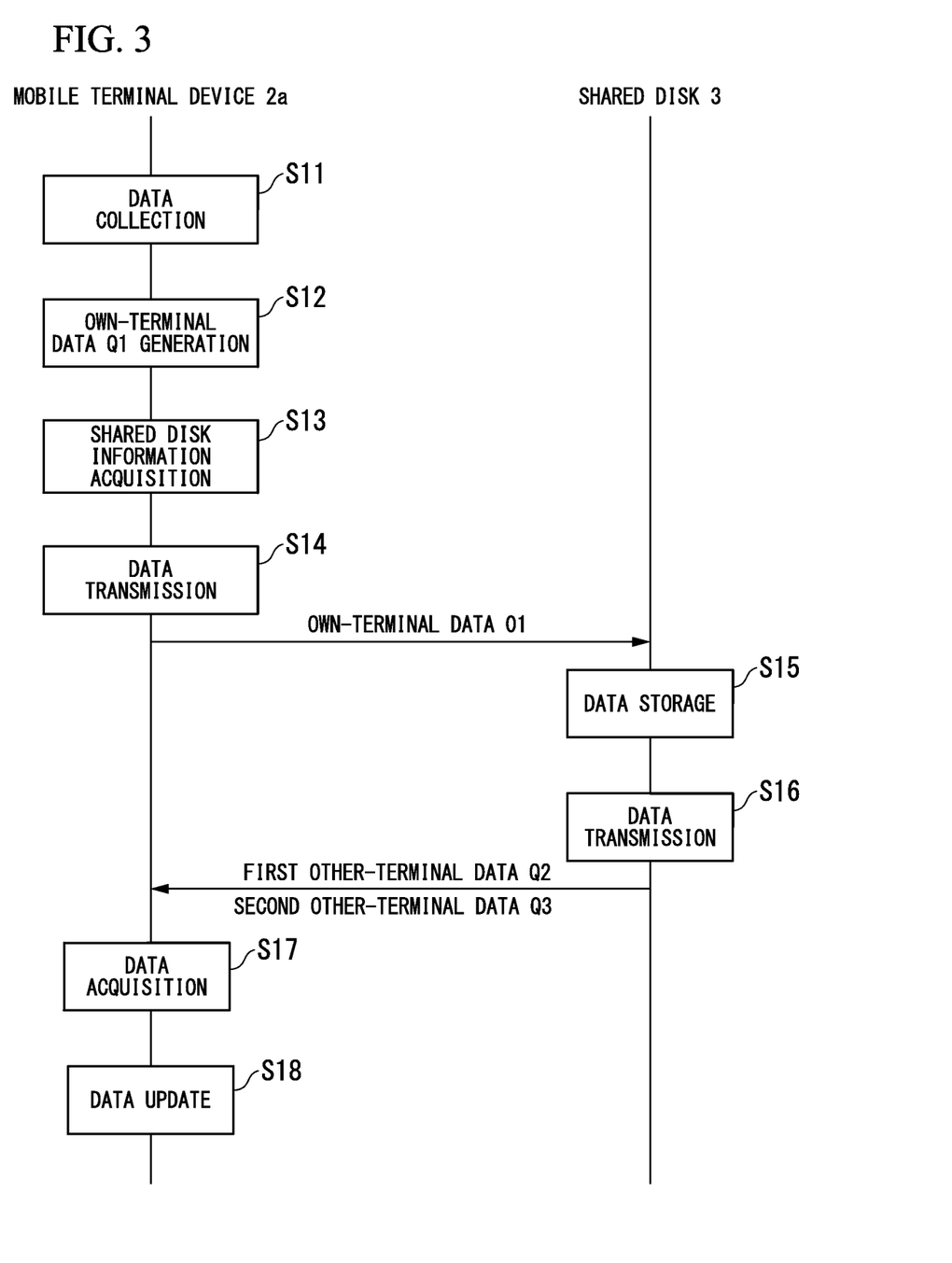
FIG. 3 is a flow chart showing the operations of the mobile terminal device and a shared disk when the mobile terminal device acquires other-terminal data from the shared disk to perform a sharing of information according to the embodiment of the present invention.

FIG. 3 is a flow chart describing the operations of the mobile terminal device 2a and the shared disk 3 when the mobile terminal device 2a acquires the first other-terminal data Q2 and the second other-terminal data Q3 from the shared disk 3 to perform sharing of information.

As shown in FIG. 3, the mobile terminal device 2a collects data related to the field device F (step S11). In the step S11, the communicator 21 communicates with the field device F under the control of the controller 26, and information acquired from the field device F is stored in the storage 25 as data.

Subsequently, the mobile terminal device 2a generates the own-terminal data Q1 (step S12). In the step S12, the data processor 26a extracts information related to maintenance information from the data collected in the step S11, and packages the extracted information and other necessary information (for example, confirmation points generated by a worker) to generate the own-terminal data Q1. The own-terminal data Q1 is packaged in a transmittable form via the network 5. The own-terminal data Q1 generated as described above is stored in the own-terminal data storage 25a.

The operations in these step S11 and step S12 are performed under the condition that the mobile terminal device 2a is not connected to the network 5. Then, after the mobile terminal device 2a is connected to the network 5, the mobile terminal device 2a acquires the information stored in the shared disk 3 via the network 5 (step S13). The information acquired in the step S13 includes an Internet Protocol (IP) address indicating the position of the shared disk 3 in the network 5, or the like.

Figure 4A:
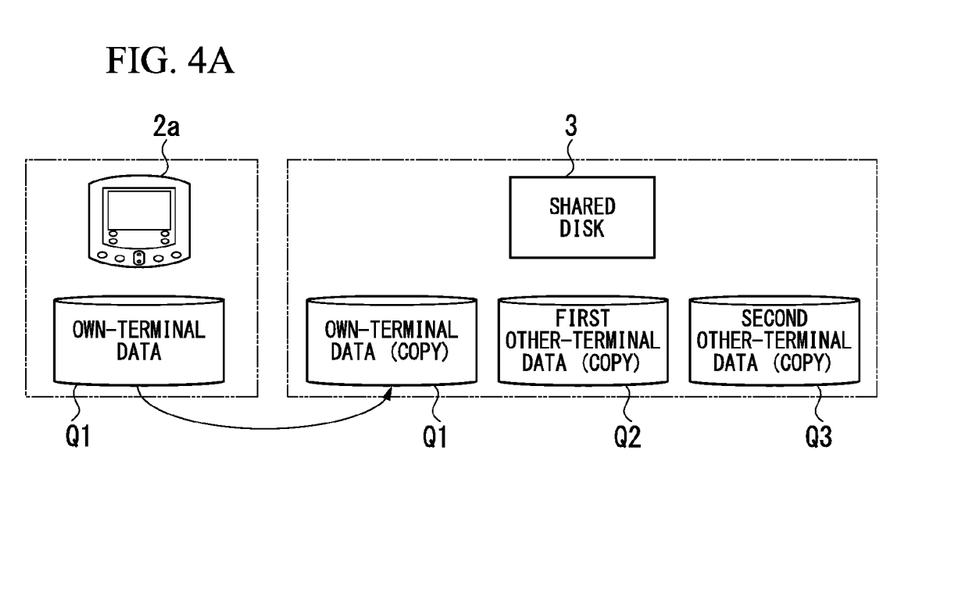
FIG. 4A is a schematic diagram showing the condition of data transmission when the mobile terminal device acquires other-terminal data from the shared disk to perform a sharing of information according to the embodiment of the present invention.

When the position of the shared disk 3 is specified, the mobile terminal device 2a transmits the own-terminal data Q1 to the shard disk 3 (step S14). In the step S14, the data transmission processor 10 reads the own-terminal data Q1 stored in the own-terminal data storage 25a, and inputs the own-terminal data Q1 into the shared disk 3 via the network 5. Thereby, as shown in a schematic diagram of FIG. 4A, the copy of own-terminal data Q1 is stored into the shared disk 3.

When the own-terminal data Q1 is input into the shared disk 3, the shared disk 3 stores the own-terminal data Q1 (step S15). Subsequently, the mobile terminal device 2a searches whether terminal data other than the own-terminal data Q1 (in other words, at least one of the first other-terminal data Q2 and the second other-terminal data Q3) is stored in the shared disk 3. When the terminal data other than the own-terminal data Q1 is stored in the shared disk 3, the mobile terminal device 2a requests the output of the terminal data. Thereby, the shard disk 3 performs a data transmittance (step S16). Hereinafter, a case that the first other-terminal data Q2 and the second other-terminal data Q3 are transmitted to the mobile terminal device 2a will be described.

The mobile terminal device 2a acquires the first other-terminal data Q2 and the second other-terminal data Q3 (step S17), expands the package, and performs a data update (step S18). In the step S17 and the step S18, the data transmission processor 10 of the mobile terminal device 2a receives the first other-terminal data Q2 and the second other-terminal data Q3, and writes the first other-terminal data Q2 and the second other-terminal data Q3 into the other-terminal data storage 25b. Thereby, as shown in a schematic diagram of FIG. 4B, the copies of the first other-terminal data Q2 and the second other-terminal data Q3 are stored in the mobile terminal device 2. At this time, when the first other-terminal data Q2 or the second other-terminal data Q3 previously stored in the other-terminal data storage 25b exists and the first other-terminal data Q2 or the second other-terminal data Q3 acquired later has been generated after the generation of the first other-terminal data Q2 or the second other-terminal data Q3 previously stored in the other-terminal data storage 25b, the data transmission processor 10 performs an overwrite processing of the first other-terminal data Q2 or the second other-terminal data Q3.

Figure 4B:
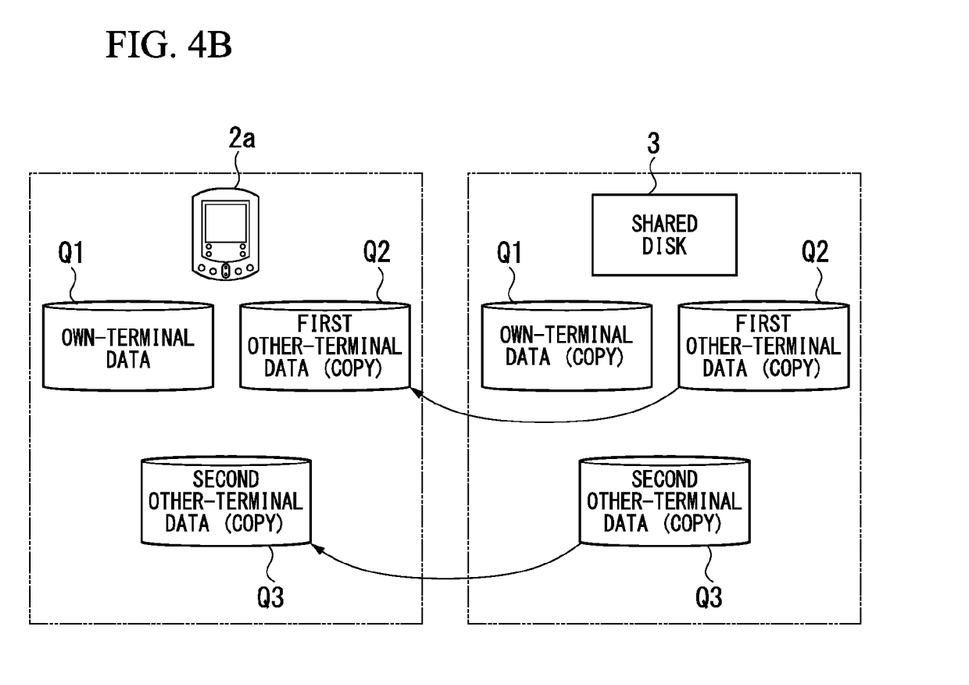
FIG. 4B is a schematic diagram showing the condition of data transmission when the mobile terminal device acquires other-terminal data from the shared disk to perform the sharing of information according to the embodiment of the present invention.

By the above-described operations, as shown in FIG. 4B, the own-terminal data Q1, the first other-terminal data Q2, and the second other-terminal data Q3 are collected in the mobile terminal device 2a. Thereby, the maintenance information acquired by all of the mobile terminal devices 2 is collected in the mobile terminal device 2a, and the sharing of information is finished. Each mobile terminal device 2 performs similar operations to those described above, and thereby, the maintenance information related to the field devices F is shared among all of the mobile terminal devices 2.

As described above, when the mobile terminal devices 2a is connected to the network 5, the mobile terminal devices 2a automatically and collectively acquires the first other-terminal data Q2 and the second other-terminal data Q3 generated in the other mobile terminal devices 2b and the mobile terminal devices 2c from the shared disk 3 connected to the mobile terminal devices 2a via the network 5. Thereby, the information is easily shared.

Since the first other-terminal data Q2 and the second other-terminal data Q3 are directly transmitted to the mobile terminal devices 2a and stored in the mobile terminal devices 2a, it is unnecessary to perform a sort of sequential data. Therefore, even if the mobile terminal devices 2a frequently receives the first other-terminal data Q2 and the second other-terminal data Q3, the load of the mobile terminal devices 2a does not increase.

Figure 5:
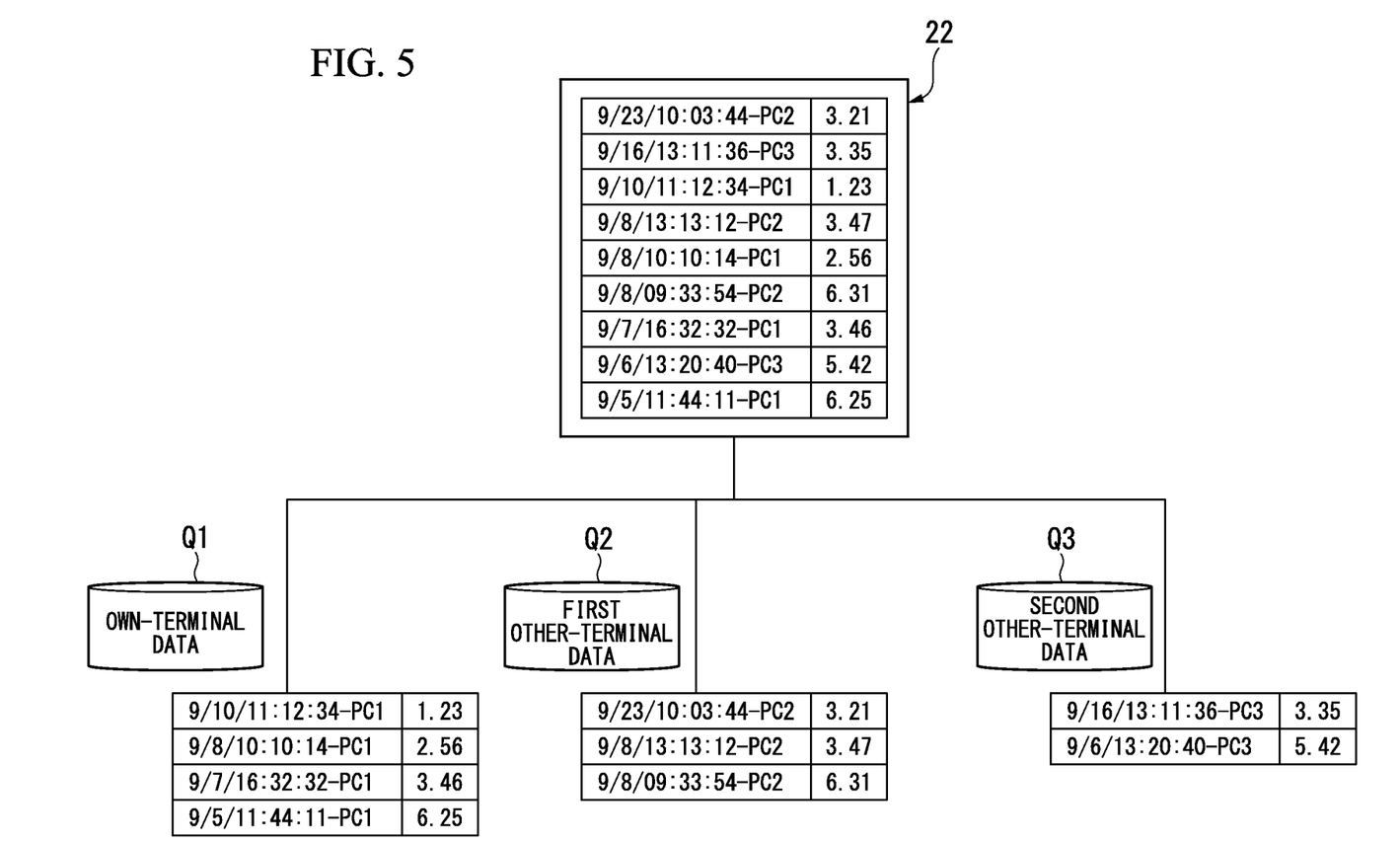
FIG. 5 is a schematic diagram showing a display example of shared maintenance information according to the embodiment of the present invention.

FIG. 5 is a schematic diagram showing the display example of shared maintenance information in the mobile terminal devices 2a. As shown in FIG. 5, the data display processor 20 of the mobile terminal devices 2a extracts maintenance information related to the specific field device F among the own-terminal data Q1, the first other-terminal data Q2 and the second other-terminal data Q3, integrates them to generate a time-series list, and displays the list on the display 22. In this way, by sorting and displaying the maintenance information related to the specific field device F, high visibility information is provided to a worker.

It is unnecessary to display all of the maintenance information related to the specific field device F on the display 22. In this case, since it is only necessary to sort a part of the maintenance information, it is possible to rapidly finish the generation of list.

(Acquisition of Other-Terminal Data from Another Mobile Terminal Device 2)

Figure 6:
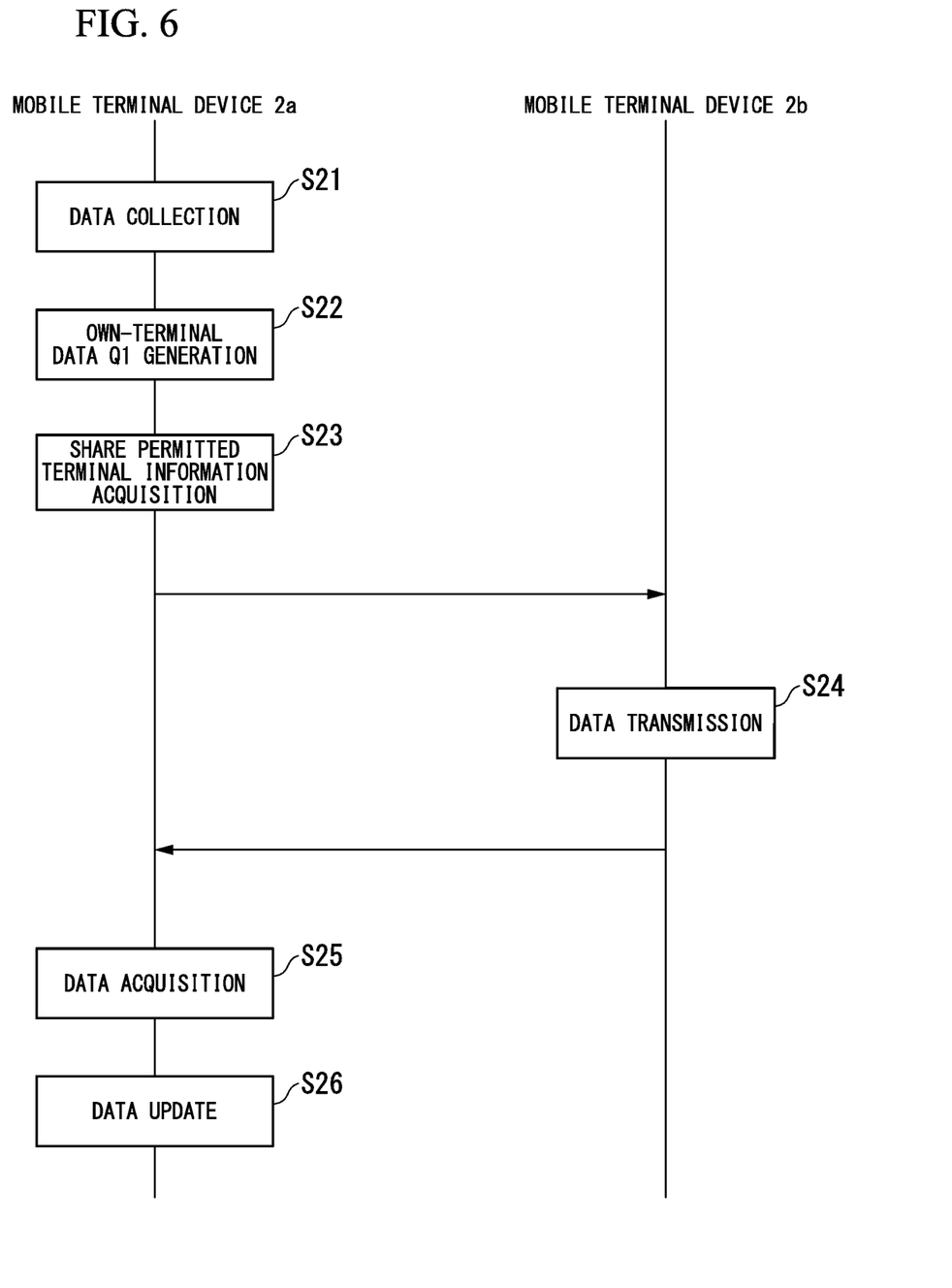
FIG. 6 is a flow chart showing the operations of the mobile terminal device when the mobile terminal devices perform the sharing of information each other according to the embodiment of the present invention.

FIG. 6 is a flow chart showing the operations of the mobile terminal device 2a and the mobile terminal device 2b when the mobile terminal devices 2a acquires the first other-terminal data Q2 and the second other-terminal data Q3 from another mobile terminal device 2 (the mobile terminal device 2b) to perform the sharing of information.

As shown in FIG. 6, the mobile terminal device 2a collects data related to the field device F (step S21). The operation in the step S21 is similar to that in the above-described step S11. Subsequently, the mobile terminal device 2a generates the own-terminal data Q1 (step S22). The operation in the step S22 is similar to that in the above-described step S12.

Subsequently, the mobile terminal device 2a is connected to the network 5, and searches whether another mobile terminal device 2a where the sharing of information is permitted is connected to the network 5. Hereinafter, the case that the mobile terminal device 2b is connected to the network 5 will be described. The mobile terminal device 2a acquires information of the mobile terminal device 2b where the sharing of information is permitted (step S23). The information acquired in the step S23 includes an Internet Protocol (IP) address indicating the position of the mobile terminal device 2b in the network 5, or the like.

When the position of the mobile terminal device 2b is specified, the mobile terminal device 2a requests the mobile terminal device 2b to output the first other-terminal data Q2 without transmitting the own-terminal data Q1. Thereby, the mobile terminal device 2b transmits the first other-terminal data Q2 to the mobile terminal device 2a (step S24). In addition, the mobile terminal device 2a searches whether the second other-terminal data Q3 is stored in the mobile terminal device 2b. When the second other-terminal data Q3 is stored in the mobile terminal device 2b, the mobile terminal device 2a also requests the mobile terminal device 2b to output the second other-terminal data Q3. Thereby, in the step S24, the mobile terminal device 2b also transmits the second other-terminal data Q3 to the mobile terminal device 2a.

The mobile terminal device 2a acquires the first other-terminal data Q2 and the second other-terminal data Q3 (step S25), expands the package, and performs a data update (step S26). The operations in these step S25 and step S26 are similar to those in the S17 and step S18, respectively.

Figure 7A:
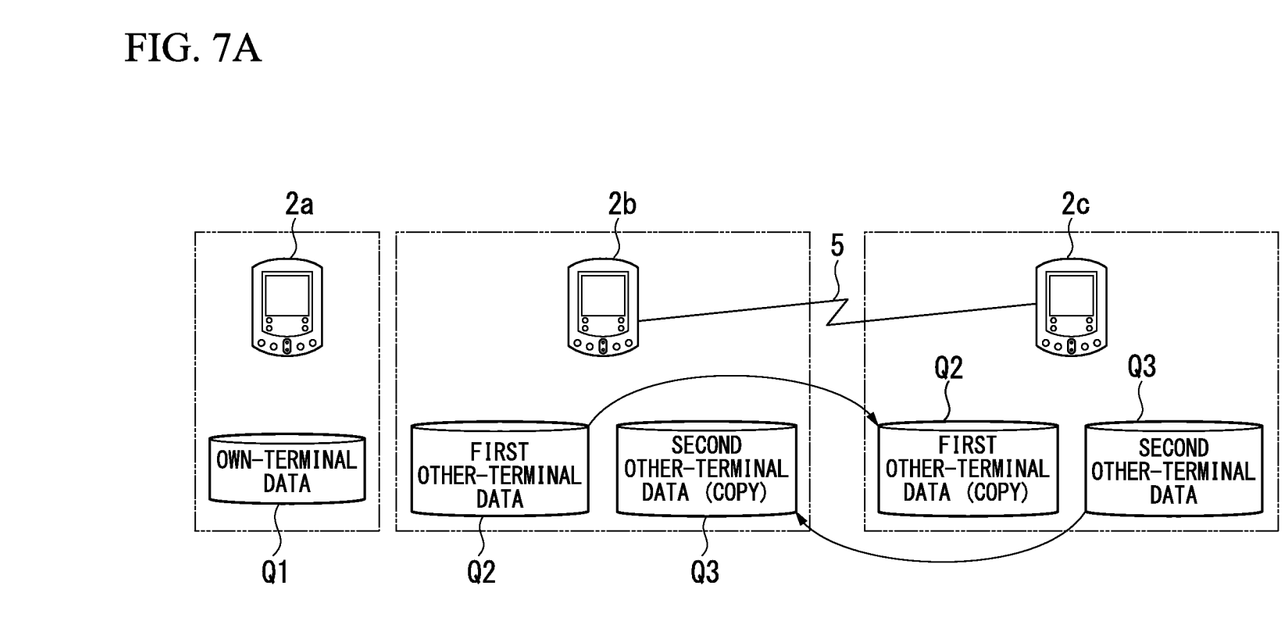
FIG. 7A is a schematic diagram showing the condition of data transmission when the mobile terminal devices perform the sharing of information each other according to the embodiment of the present invention.

Each mobile terminal device 2 operates as described above, thereby, the own-terminal data Q1, the first other-terminal data Q2 and the second other-terminal data Q3 are transmitted and shared among all of the mobile terminal devices 2. Each of FIGS. 7A to 7C is a schematic diagram showing one example of a situation where the own-terminal data Q1, the first other-terminal data Q2 and the second other-terminal data Q3 are shared among all of the mobile terminal devices 2.

For example, under a condition where the own-terminal data Q1 is stored in the mobile terminal device 2a, the first other-terminal data Q2 is stored in the mobile terminal device 2b, and the second other-terminal data Q3 is stored in the mobile terminal device 2c, when the mobile terminal device 2b and the mobile terminal device 2c are concurrently connected to the network 5, the mobile terminal device 2b and the mobile terminal device 2c perform the processing shown in FIG. 6. Thereby, as shown in FIG. 7A, the copy of the second other-terminal data Q3 is stored in the mobile terminal devices 2b, and the copy of the first other-terminal data Q2 is stored in the mobile terminal device 2c.

Figure 7B:
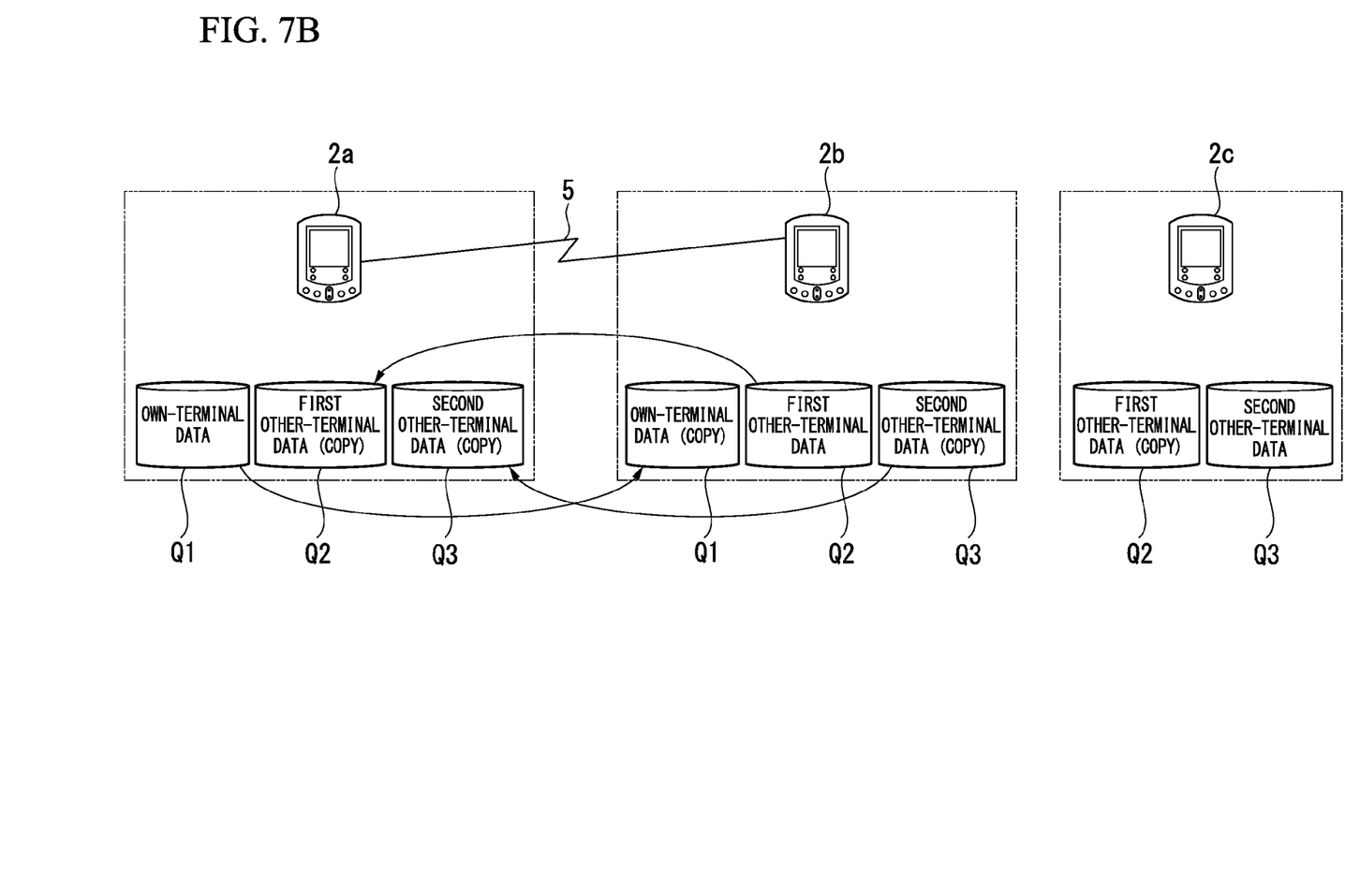
FIG. 7B is a schematic diagram showing the condition of data transmission when the mobile terminal devices perform the sharing of information each other according to the embodiment of the present invention.

Subsequently, as shown in FIG. 7B, when the mobile terminal device 2a and the mobile terminal device 2b are concurrently connected to the network 5, the copy of the first other-terminal data Q2 and the copy of the second other-terminal data Q3 are stored in the mobile terminal device 2a and the copy of the own-terminal data Q1 is stored in the mobile terminal device 2b. The first other-terminal data Q2 and the second other-terminal data Q3 stored in the mobile terminal device 2a have not been generated after the generation of the first other-terminal data Q2 and the second other-terminal data Q3 stored in the mobile terminal device 2b. Therefore, even if the mobile terminal device 2b receives the first other-terminal data Q2 and the second other-terminal data Q3 stored in the mobile terminal device 2a, the mobile terminal device 2b does not update (overwrite) the first other-terminal data Q2 and the second other-terminal data Q3 stored in the mobile terminal device 2b.

Figure 7C:
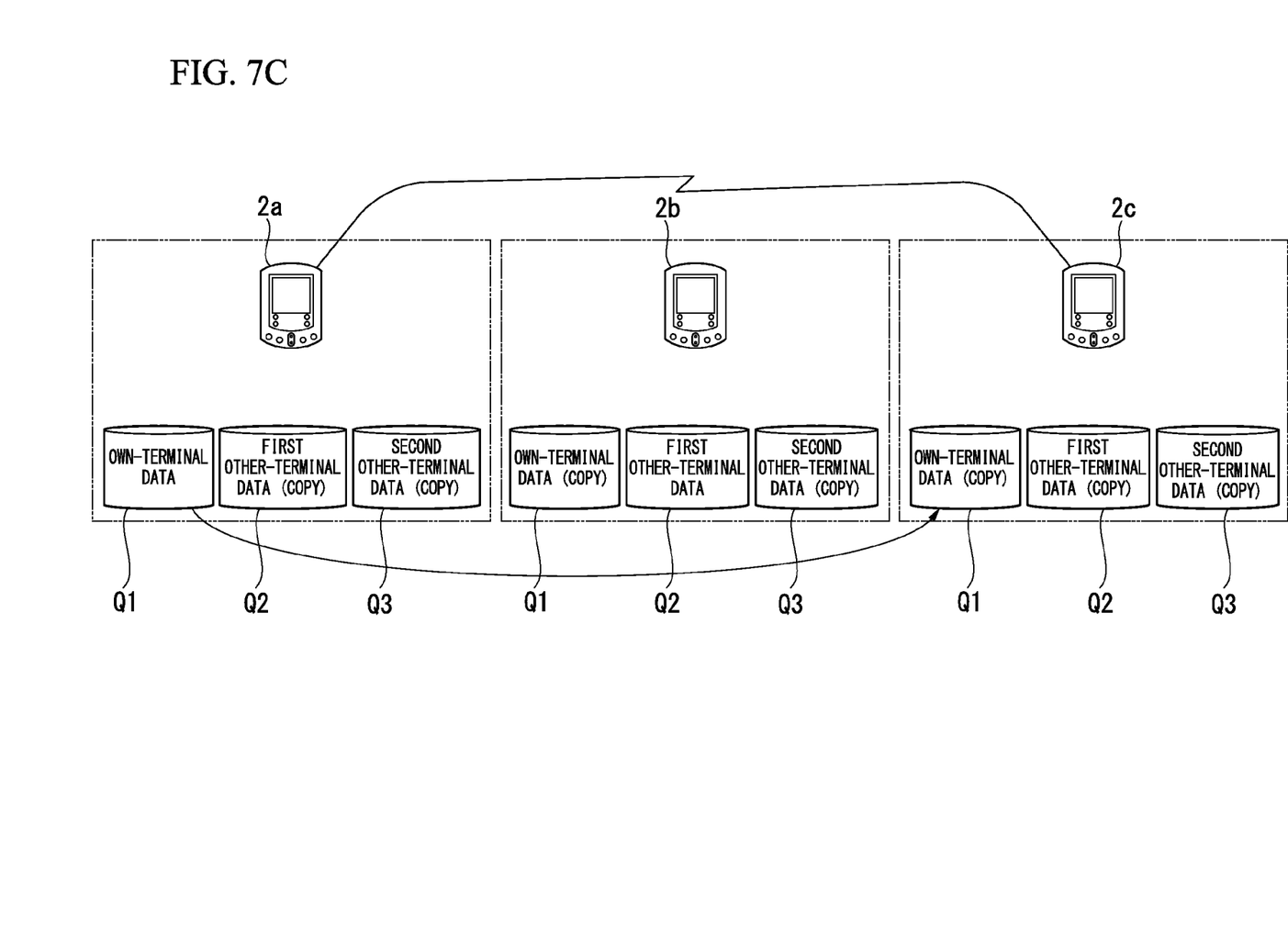
FIG. 7C is a schematic diagram showing the condition of data transmission when the mobile terminal devices perform the sharing of information each other according to the embodiment of the present invention.

Subsequently, as shown in FIG. 7C, when the mobile terminal device 2a and the mobile terminal device 2c are concurrently connected to the network 5, the copy of the own-terminal data Q1 is stored in the mobile terminal device 2c. Thereby, the own-terminal data Q1, the first other-terminal data Q2, and the second other-terminal data Q3 are shared among all of the mobile terminal devices 2. The first other-terminal data Q2 and the second other-terminal data Q3 stored in the mobile terminal device 2a have not been generated after the generation of the first other-terminal data Q2 and the second other-terminal data Q3 stored in the mobile terminal device 2c. Therefore, even if the mobile terminal device 2c receives the first other-terminal data Q2 and the second other-terminal data Q3 stored in the mobile terminal device 2a, the mobile terminal device 2c does not update (overwrite) the first other-terminal data Q2 and the second other-terminal data Q3 stored in the mobile terminal device 2c.

The operation flow for sharing the own-terminal data Q1, the first other-terminal data Q2, and the second other-terminal data Q3 among all of the mobile terminal devices 2 is not limited to that shown in FIGS. 7A to 7C. For example, when the mobile terminal device 2a, the mobile terminal device 2b, and the mobile terminal device 2c are concurrently connected to the network 5, each mobile terminal device 2 performs the operations shown in the flow-chart of FIG. 6. Thereby, the own-terminal data Q1, the first other-terminal data Q2, and the second other-terminal data Q3 are shared among all of the mobile terminal devices 2.

As described above, by transmitting and receiving the terminal data among the mobile terminal devices 2, it is possible to share information among the mobile terminal devices 2 without using the shared disk 3. Therefore, a configuration which does not including the shared disk 3 may be adapted.

Although the foregoing has been a description of the preferred embodiments of the present invention with references made to the drawings, it is indisputable that the present invention is not limited to the embodiments described above. The various shapes of each component, the combination of the components, or the like described in the above-described embodiments is merely an example, and can be freely modified based on requirements of design or the like within the scope of the present invention.

For example, in the embodiments described above, the example was described in which the information shared among the mobile terminal devices 2 is the terminal data including the maintenance information of the field device F. However, instead of the terminal data, it is possible to share setting data including model information for adjusting the field device F.

The mobile terminal device 2 only has to include a file storage function and a network function and is not required to perform an advanced data processing. Therefore, a device such as a handheld terminal may be used as the mobile terminal device 2. In other words, the concept of the computer according to the present invention includes such a device.

For example, a device (tablet-type device), which does not include a setting function for the field device F and includes only viewer function, may be used as a part of the plurality of mobile terminal devices 2. Also, using the device, it is possible to share the own-terminal data Q1, the first other-terminal data Q2, and the second other-terminal data Q3.

What is claimed is:

1. A device setting apparatus, comprising:
a data transmission processor configured to:
communicate with a field device via a first network to acquire information of the field device when the device setting apparatus is not connected to a second network;
extract information related to maintenance information from the information of the field device;
package the extracted information and information generated by a worker to generate own-terminal information; and
automatically and collectively acquire information used in at least another device setting apparatus as other-device information from an external storage when the device setting apparatus is connected to the second network, the external storage being communicatively connectable to the device setting apparatus via the second network;
an own-terminal information storage storing the own-terminal information; and
an other-device information storage storing the other-device information.

2. The device setting apparatus according to claim 1, wherein the data transmission processor is configured to update the other-device information when a time-stamp of the acquired other-device information is newer than a time-stamp of the other-device information previously stored in the other-device information storage.

3. The device setting apparatus according to claim 1, further comprising:
a data display processor configured to integrate and display the own-device information and the other-device information.

4. The device setting apparatus according to claim 1, wherein the external storage corresponds to a shared storage storing information used in a plurality of device setting apparatuses, and
the data transmission processor is configured to input information used in the device setting apparatus into the shared storage as own-device information and to acquire the other-device information stored in the shared storage.

5. The device setting apparatus according to claim 1, wherein the external storage corresponds to a plurality of other device setting apparatuses,
the other device setting apparatuses comprise a first device setting apparatus and a second device setting apparatus, and
the data transmission processor is configured to acquire first information related to the first device setting apparatus and second information related to the second device setting apparatus from the first device setting apparatus as the other-device information when the first device setting apparatus stores the second information.

6. A non-transitory computer-readable storage medium storing a computer program, which when executed by an apparatus, causes the apparatus to perform:
communicating with a field device via a first network to acquire information of the field device when the apparatus is not connected to a second network;
extracting information related to maintenance information from the information of the field device;
packaging the extracted information and information generated by a worker to generate own-terminal information;
automatically and collectively acquiring information used in at least another apparatus as other-device information from an external storage when the apparatus is connected to the second network, the external storage being connectable to the apparatus via the second network;
storing the own-terminal information; and
storing the other-device information.

7. The non-transitory computer-readable storage medium storing the computer program according to claim 6, wherein automatically and collectively acquiring the information used in the at least another apparatus as the other-device information comprises updating the other-device information when a time-stamp of the acquired other-device information is newer than a time-stamp of the previously stored other-device information.

8. The non-transitory computer-readable storage medium storing the computer program according to claim 6, wherein the computer program, which when executed by the apparatus, further causes the apparatus to perform;
and
integrating and displaying the own-device information and the other-device information.

9. The non-transitory computer-readable storage medium storing the computer program according to claim 6, wherein the external storage corresponds to a shared storage storing information used in a plurality of apparatuses, and automatically and collectively acquiring the information used in the at least another apparatus as the other-device information comprises inputting information used in the apparatus into the shared storage as own-device information and acquiring the other-device information stored in the shared storage.

10. The non-transitory computer-readable storage medium storing the computer program according to claim 6, wherein the external storage corresponds to a plurality of other apparatuses,
the other apparatuses comprise a first apparatus and a second apparatus, and
automatically and collectively acquiring the information used in the at least another apparatus as the other-device information comprises acquiring first information related to the first apparatus and second information related to the second apparatus from the first apparatus as the other-device information when the first apparatus stores the second information.

11. A method for sharing information among a plurality of device setting apparatuses, the method comprising:
communicating with a field device via a first network to acquire information of the field device when a device setting apparatus is not connected to a second network;
extracting information related to maintenance information from the information of the field device;
packaging the extracted information and information generated by a worker to generate own-terminal information;
storing the own-terminal information in the device setting apparatus;
connecting the device setting apparatus to the second network;
automatically and collectively acquiring information used in at least another device setting apparatus as other-device information from an external storage using the device setting apparatus when the device setting apparatus is connected to the second network, the external storage being communicatively connectable to the device setting apparatus via the second network; and
storing the other-device information in the device setting apparatus.

12. The method for sharing the information according to claim 11, wherein storing the other-device information in the device setting apparatus comprises updating the other-device information when a time-stamp of the input other-device information is newer than a time-stamp of the previously stored other-device information.

13. The method for sharing the information according to claim 11, further comprising:
integrating and displaying the own-device information and the other-device information.

14. The method for sharing the information according to claim 11, wherein the external storage corresponds to a shared storage storing information used in the plurality of device setting apparatuses, and
storing the other-device information in the device setting apparatus comprises inputting information used in the device setting apparatus into the shared storage as own-device information and acquiring the other-device information stored in the shared storage.

15. The method for sharing the information according to claim 11, wherein the external storage corresponds to a plurality of other device setting apparatuses,
the other device setting apparatuses comprise a first device setting apparatus and a second device setting apparatus, and
storing the other-device information in the device setting apparatus comprises acquiring first information related to the first device setting apparatus and second information related to the second device setting apparatus from the first device setting apparatus as the other-device information when the first device setting apparatus stores the second information.

\* \* \* \* \*